United States Patent [19]
Chung et al.

[11] Patent Number: 5,670,582
[45] Date of Patent: Sep. 23, 1997

[54] PROCESS FOR HALOGENATION OF ISOMONOOLEFIN/PARA-ALKYLSTYRENE COPOLYMERS

[75] Inventors: David Yen-Lung Chung, Bellaire; Neil Frederick Newman, Kingwood, both of Tex.

[73] Assignee: Exxon Chemical Patents Inc., Houston, Tex.

[21] Appl. No.: 686,194

[22] Filed: Jul. 24, 1996

[51] Int. Cl.$^6$ ............................................. C08F 8/22
[52] U.S. Cl. ..................... 525/356; 525/333.4; 525/355
[58] Field of Search ................................. 525/355, 356

[56] References Cited

U.S. PATENT DOCUMENTS

| | | | |
|---|---|---|---|
| 3,018,275 | 1/1962 | Cottle | 26/85.3 |
| 5,077,345 | 12/1991 | Newman et al. | 525/355 |
| 5,162,445 | 11/1992 | Powers et al. | 525/333.4 |
| 5,306,740 | 4/1994 | Laas et al. | 525/356 |
| 5,569,723 | 10/1996 | Baade et al. | 525/356 |

FOREIGN PATENT DOCUMENTS

| | | |
|---|---|---|
| 709401 | 5/1996 | European Pat. Off. . |
| 867737 | 5/1961 | United Kingdom . |

*Primary Examiner*—Bernard Lipman
*Attorney, Agent, or Firm*—Myron B. Kurtzman

[57] ABSTRACT

A process for halogenating a copolymer of a $C_4$-$C_7$ isomonoolefin, eg. isobutylene, and a para-alkylsyrene, e.g., para-methylstyrne, is disclosed. Increased halogenation efficiency is achieved by conducting the reaction under free radical halogenation conditions and in the presence of an oxidizing agent, e.g. hydrogen peroxide, which oxidizes hydrogen halide generated in-situ in the reaction back to free halogen. The oxidizing agent is preferably not added to the reaction medium until after first stage halogenation is substantially completed.

27 Claims, No Drawings

PROCESS FOR HALOGENATION OF ISOMONOOLEFIN/PARA-ALKYLSTYRENE COPOLYMERS

BACKGROUND OF THE INVENTION

1. Field of the Invention

The invention relates to an improved process for halogenating copolymers of a $C_4$ to $C_7$ isomonoolefin and a para-alkylstyrene.

2. Description of the Related Art

Halogenation process in which a polymer is reacted with a halogenating agent to produce a halogenated polymer containing chemically bound halogen are well known in the art. For example, halogenated copolymers comprising a $C_4$ to $C_7$ isomonoolefin, e.g., isobutylene, and from about 0.5 to 10 wt % of a conjugated diene, e.g., isoprene (commercially known as butyl rubber), may be readily prepared using relatively facile ionic reactions by contacting the polymer, preferably dissolved in organic solvent, with a halogen source, e.g., molecular bromine or chlorine, and heating the mixture at a temperature ranging from about 20° C. to 90° C. for a period of time sufficient for the addition of free halogen in the reaction mixture onto the polymer backbone. Such processes are generally disclosed in U.S. Pat. No. 2,732,354.

A major inefficiency in such process is that the theoretical fraction of halogen present in the reaction mixture which can be placed on the polymer is 50%, and the actual utilization is usually less than 45%. Most of the remaining halogen fraction will combine with hydrogen extracted from the polymer to form a hydrogen halide by-product which, under normal conditions, does not halogenate the polymer. This by-product is subsequently neutralized with an alkaline material and washed from the polymer reaction product as described, for example, in U.S. Pat. No. 5,077,345.

One known method to enhance the efficiency of butyl rubber ionic halogenation involves the inclusion in the reaction media of at least 0.5 mole per mole of halogenating agent of an oxidizing agent such as hydrogen peroxide, which oxidizes the hydrogen halide by-product as it forms back to ionic halogen. This regenerated halogen is thus available to further halogenate the butyl rubber thereby increasing the halogenation utilization by as much as 70%. Such process is disclosed in U.S. Pat. No. 3,018,275 and in UK Patent 867,737.

Another process for improving the bromination efficiency in rubber bromination processes is to conduct the reaction in the presence of elemental bromine and an aqueous solution of an organic azo compound such as azodiisobutronitrile and/or an alkali or alkaline earth metal hypochlorite, as disclosed in EP 0709401 A1.

A new class of halogenated copolymers have been discovered which offer many of the same properties as halogenated butyl rubber, but are even more ozone and solvent resistant. These materials are the halogenation product of random copolymers of from about 10 to 99.5 wt % of a $C_4$ to $C_7$ isomonoolefin, such as isobutylene, and from about 0.5 to 90 wt % of a para-alkylstyrene comonomer such that at least some of the alkyl substituent groups present in the styrene monomer units contain halogen.

More preferred materials are elastomeric copolymers of isobutylene and para-methylstyrene containing from about 0.5 to about 20 wt % para-methylstyrene wherein up to about 65% of the methyl substituent groups present on the benzene ring contain a bromine or chlorine atom, preferably a bromine atom. These copolymers (hereafter referred to as HI-PAS) have a substantially homogenous compositional distribution such that at least 95% by weight of the polymer has a para-alkylstyrene content within 10% of the average para-alkystyrene content of the polymer. They are also characterized by a very narrow molecular weight distribution (Mw/Mn) of less than about 5, more preferably less than about 2.5, viscosity average molecular weights in the range of from about 500,000 up to about 2,000,000, and a glass transition temperature (Tg) of below about 50° C. Halogenated copolymers of this type are disclosed in U.S. Pat. No. 5,162,445, the complete disclosure of which is incorporated herein by reference.

As described in the '445 patent, HI-PAS copolymers contain no ethylenic backbone unsaturation as does butyl rubber, and therefore halogenation is carried out under free radical halogenation conditions using light as an initiator or using an organic free radical initiator. Halogenation occurs essentially exclusively on the alkyl substituent groups and, in the case of para-methylstyrene, benzylic halide functionality is formed.

However, even under such free radical halogenation conditions, the halogen utilization in the process is typically only about 45% or less.

SUMMARY OF THE INVENTION

The invention provides a process for halogenating a copolymer of a $C_4$ to $C_7$ isomonoolefin and a para-alkylstyrene comprising contacting said copolymer under free radical halogenation conditions with a halogenating agent and hydrogen peroxide, and recovering said halogenated copolymer containing at least about 0.05 mole % of haloalkyl groups.

In another embodiment of the invention, a process is provided for halogenating a copolymer of a $C_4$ to $C_7$ isomonoolefin and a para-alkyl styrene comprising:

a) contacting said copolymer with a halogenating agent and an organic free radical initiator under free radical halogenation conditions to form a reaction product mixture containing a partially halogenated copolymer and in-situ generated hydrogen halide;

b) contacting said reaction product mixture from step (a) with an oxidizing agent capable of converting said hydrogen halide to free halogen; and c) continuing said halogenation until a halogenated copolymer containing at least about 0.05 mole % of haloalkyl groups is obtained.

In yet another embodiment of the invention, a multi stage process for brominating a copolymer of $C_4$ to $C_7$ isomonoolefin and a para-alkystyrene is provided comprising:

a) forming a solution of said copolymer in organic solvent in a first reactor zone;

b) contacting said solution with elemental bromine and an organic free radical initiator under free radical bromination conditions to form a reaction product mixture comprising a partially brominated copolymer and in-situ generated hydrogen bromide;

c) transferring said reaction product mixture to a second reactor zone and contacting said mixture with an oxidizing agent capable of converting said hydrogen bromide to free bromine; and d) continuing said bromination in said second reactor zone until a brominated copolymer containing at least about 0.05 mole % of bromoalkyl groups is obtained.

DETAILED DESCRIPTION OF THE INVENTION

As pointed out above, the copolymers which provide the halogenation substrate in accordance with this invention are random copolymers containing from about 10 to 99.5 wt % of a $C_4$ to $C_7$ isomonoolefin and correspondingly about 0.5 to 90 wt % of a copolymerized para-alkylstyrene having the structure:

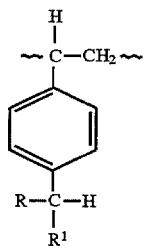

in which R and $R^1$ are independently selected from the group consisting of hydrogen, alkyl, primary alkyl halides, secondary alkyl halides, and mixtures thereof. Preferably R and $R^1$ are hydrogen, $C_1$ to $C_5$ alkyl, or $C_1$ to $C_5$ primary or secondary alkyl and most preferably R and $R^1$ are hydrogen.

The more preferred copolymers are copolymers of isobutylene and para-methylstyrene and the most preferred copolymers are elastomeric copolymers containing from about 0.5 to about 20 wt % para-methylstyrene. These copolymers and their method of preparation are disclosed in the above mentioned U.S. Pat. No. 5,162,445. For convenience, these copolymers are hereafter referred to as "I-PAS copolymers".

The present invention is based on the discovery that the utilization of halogen, even in a free radical halogenation process as required in the halogenation of I-PAS copolymers, can be substantially increased by carrying out the reaction in the presence of an oxidizing agent which is added to the reaction medium either at the onset of the halogenation reaction or, more preferably, in a second stage after the polymer has been partially halogenated.

The invention is particularly applicable to free radical halogenation conducted using an organic free-radical initiator such as a bis-azo compound and wherein the oxidizing agent is added to the reaction media in a second stage only after a substantial portion of the halogen source e.g., molecular bromine, has been consumed in a first reaction stage. This sequential addition of the organic free radical initiator and halogen source in a first stage and oxidizing agent in a second stage has been found to minimize unwanted reactions between the organic free radical initiator and the oxidizing agent and to maximize halogen utilization in such processes.

Halogenating agents which may be used as a source of halogen in accordance with the invention include molecular bromine ($Br_2$) or chlorine, bromine chloride, iodine bromide and mixtures thereof. Where the free radical halogenation is conducted with the oxidizing agent present at the onset of the halogenation reaction, hydrogen bromide or hydrogen chloride may be used as the halogen source. The preferred halogen source is molecular bromine.

Since a considerable portion of the hydrogen halide, e.g., hydrogen bromide, generated in-situ as a halogenation process by-product is oxidized to regenerate useful halogen, smaller amounts of halogenating agent are initially required to achieve a given degree of polymer halogenation than would be the case where the reaction is conducted without the use of oxidizing agent. As a general rule, the amount of halogenating agent present in the reaction media may vary between about 0.1 to 25 php (parts by weight per 100 parts by weight polymer), more preferably from about 0.2 to 10 php and most preferably from about 0.2 to 6 php.

Any of the known free radical initiators can be used in the process. Free radical initiators which are preferred in accordance with the invention include any source of light, e.g., actinic white light or, where the reaction is conducted in the absence of light, one or more organic free radical initiators. Preferred initiators are those which have a half life of between about 0.5 and 2500 minutes under the desired reaction conditions, and more preferably a half life of about 10 to 300 minutes. The amount of chemical initiator employed may vary between about 0.02 to about 1 part by weight php, preferably between about 0.02 and 0.4 parts by weight php. The most preferred chemical initiators are az-obis compounds including azobisisobutyronitrile, 2,2'-azobis (2,4,4 trimethyl pentane nitrile), azobis (2-methyl butyro) nitrile and azobis (2,4 dimethyl valero) nitrile. Other radical initiators such as organic peroxides can also be used provided they are relatively poor at hydrogen abstraction so that they react preferentially with the molecular halogen molecules to form halogen atoms rather than with the I-PAS copolymer or any solvent present in the reaction mixture to form alkyl radicals or crosslinked structures.

The oxidizing agents which have been found suitable for the purposes of the present invention are water soluble materials which contain oxygen. Preferred agents are peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic, perzirconic, perchromic, permolybdic, pertungstic, perunanic, perboric, perphosphoric, perpyrophosphoric, persulfates, perchloric, perchlorate and periodic acids. Of the foregoing, hydrogen peroxide and hydrogen peroxide-forming compounds, e.g., per-acids and sodium peroxide, have been found to be most suitable for carrying out the present reaction.

The amount of oxidizing agent used in accordance with the invention depends on the amount and kind of halogenating agent used. Generally from about 0.1 to about 3 mols of oxidizing agent per mole of halogenating agent may be used. The preferred amount of oxidizing agent present in the reaction mixture ranges from about 1 to 2 mols per mol of halogenating agent.

The oxidizing agent may be introduced into the reaction zone as a solution in any suitable diluent such as carbon tetrachloride, lower alcohol, ether or water. More preferably, the oxidizing agent is introduced as an aqueous solution or water-in-oil emulsion. When introduced as an aqueous solution, the solution may contain about 10–85 wt % of the oxidizing agent; when introduced as an emulsion, the emulsion may contain about 1–50 wt % of the oxidizing agent.

The halogenation reaction may be carried out in bulk or in solution, but is preferably conducted by first dissolving the I-PAS copolymer in a suitable organic solvent such as a $C_4$ to $C_{10}$ aliphatic, cycloaliphatic or aromatic liquid. Preferred solvents include normal hexane, cyclohexane, normal pentane, normal heptane and benzene. Halogen-containing solvents such as chlorobenzene, carbon tetrachloride and chloroform may also be used. The polymer solution, which may contain from as little as 1 wt % polymer or as much as 40 wt % polymer, is introduced into a reaction zone that is provided with suitable means to permit intimate contact with the reactants. The temperature of the polymer solution is adjusted to that which is most convenient for carrying out the reaction in view of the various properties of the reactants and the volatility of the solvent. To insure a fairly rapid reaction it is advisable to employ a reaction temperature above 0° C., e.g., at least 5° C., and it is preferred to maintain the temperature between about 20° C. and 80° C. However, under certain conditions, especially where less reactive materials are employed, it may be desirable to run the reaction at temperatures ranging up to 150° C. or higher.

Where the oxidizing agent is introduced into the reaction zone at the onset of the halogenation reaction, it may be added prior to, concurrently with or subsequent to the addition of the halogenating agent and chemical free radical initiator, where present. More preferably, however, the oxidizing agent is not added to the reaction mixture until after at least about 50 wt %, more preferably about 75 to 100 wt % of the halogenating agent has been consumed in the halogenation reaction. Halogen consumption is indicated, where molecular bromine is used as the halogenating agent, by a change in color of the reaction mixture from reddish brown to a light tan or amber color. Halogen consumption can also be calculated stoichiometrically as a function of reaction speed under reaction conditions.

In another embodiment of the invention, the halogenation may be carried out in two or more separate reaction zones. In this process, the halogenation reaction is carried out as described above in a first reactor zone to form a reaction product mixture comprising a partially halogenated copolymer and in-situ generated hydrogen halide by-product. This reaction is also carried out until at least 50 wt %, more preferably at least 75 to 100 wt % of the added halogen source is consumed. Thereafter, the reaction mixture is transferred to a second reactor zone where it is contacted under mixing conditions with the oxidizing agent. The hydrogen halide generated in-situ in the first reactor zone is regenerated into free halogen by the oxidizing agent in the second reactor zone, which free halogen is then available for further halogenation of the copolymer in the second reactor zone. The oxidizing agent may be added incrementally or all at once in said second reactor zone or may be added or metered in a mixing zone positioned between the first and second reactor zone.

After completion of the halogenation reaction, the polymer may be recovered by conventional techniques, e.g., neutralization with dilute caustic, water washing and removal of solvent such as by steam stripping techniques or by precipitation using a lower alcohol such as isopropanol, followed by drying.

The halogenation of the I-PAS copolymer is generally conducted for a period of time of from about 1 minute up to about 3 of 4 hours, depending on reaction conditions until a halogenated copolymer containing at least about 0.05 mol % of haloalkyl groups is achieved. In the more preferred embodiment and where the I-PAS copolymer contains para-methylstyrene and the halogenating agent is bromine, the reaction is conducted until the polymer contains from about 0.1 to about 10 mol % of benzylic bromine (bromomethyl groups), more preferably from about 0.1 to about 2 mol % of benzylic bromine. Halogenated copolymers produced in accordance with this invention will generally contain less than about 0.003 mol % of dibromo methyl groups, even at a high degree of bromination.

The following examples are illustrative of the invention. The I-PAS copolymer used in the examples is a random elastomeric copolymer of isobutylene and 7.5 wt % of para-methylstyrene (PMS) having a Mooney Viscosity of 45 (1+8 at 125° C.).

EXAMPLE 1

In this example, light initiated bromination of the copolymer was conducted under three separate conditions, i.e., (a) without the addition of oxidizing agent; (b) oxidizing agent added concurrently with $Br_2$ and (c) oxidizing agent added only after the substantial depletion of the $Br_2$.

a) 109.5 grams of I-PAS elastomer were dissolved in 620.5 grams of cyclohexane in a baffled glass flask equipped with a dropping funnel to form a 15 wt % solution. The flask was equipped with a 150 watt tungsten light bulb mounted next to the flask and a turbine mixer. Next, a 3 wt % $Br_2$ charge (based on polymer weight) was added dropewise to the flask maintained at about 20° C. while exposed to light radiation. The bromination reaction was terminated (neutralized by NaOH) after the reddish brown $Br_2$ color in the reaction mixture had faded to a light tan color. The resulting neutralized cement was washed in water until neutral and the brominated polymer was precipitated in isopropanol and dried in a vacuum.

b) Part (a) was repeated except that 4.9 grams of emulsified 35% hydrogen peroxide in hexane (about a 2:1 peroxide to halogen mole ratio) was added to the reaction mixture concurrently with the addition of $Br_2$.

c) Part (a) was repeated except that 4.39 grams of the emulsified hydrogen peroxide were added to the reaction mixture after the reddish brown $Br_2$ color in the reaction mixture had faded to a light tan color. The reaction was continued for 7 minutes prior to neutralization.

The samples of brominated polymers were submitted for NMR analysis and results are shown in Table 1.

TABLE 1

REGENERATIVE BROMINATION (LIGHT INITIATION)

| $H_2O_2$ Addition Sequence | BrPMS Mole % | BR Utilization (BrPMS) | PMS Conversion | $Br_2PMS$ Mole % |
|---|---|---|---|---|
| (a) Control No $H_2O_2$ | 0.87 | 41% | 25.4% | 0 |
| (b) Add $H_2O_2$ together w/$Br_2$ | 1.56 | 74% | 45.5% | 0.02 |
| (c) Add $H_2O_2$ after $Br_2$ color faded | 1.54 | 73% | 44.8% | 0.02 |

Bromine Charge: 3 wt % or 2.12 mole % based on polymer.

Table 1 shows the results of light initiated bromination of I-PAS cement with and without $H_2O_2$ addition. The data clearly indicate that the addition of $H_2O_2$ significantly improved the bromine utilization as reflected by the 80% increase of BrPMS content on polymer. The sequence of $H_2O_2$ addition (either added simultaneously with $Br_2$ or after most $Br_2$ was consumed) has little impact on bromine utilization. This suggests that the Br radical does not react/ interfere with the bromine regeneration function of $H_2O_2$ in a light initiated process.

The data also indicate that the amount of undesirable $Br_2PMS$ was extremely small (0.02 mole %) even at 45% PMS conversion (or 1.56 mole % BrPMS on polymer). This suggests that the reduced cement acidity during the Regenerative Bromination may retard the formation of $Br_2PMS$. Therefore a higher BrPMS content can be achieved via this process without a significant amount of $Br_2PMS$ formation relative to convention bromination processes.

EXAMPLE 2

In this example, the bromination reaction is initiated using a bis azo chemical initiator 2,2'-azobis(2,4,4 trimethyl pentane nitrile), referred to as VAZO™-52 and using the sequence of addition of oxidizing agent as in Example 1.

a) 76.2 grams of I-PAS elastomer were dissolved in 431.8 grams of cyclohexane in a baffled glass flask equipped with a dropping funnel to form a 15 wt % solution. Next, a 0.2 wt % VAZO-52 charge (based on polymer weight) was added to the reactor flask and the contents were gently heated to 50° C. at atmospheric pressure. Thereafter, a 3 wt % $Br_2$ charge (based on polymer weight) was added dropwise to the flask maintained at 50° C. After bromine addition was complete, the reaction was continued at 50° C. for 10 minutes, after which the halogenated polymer was neutralized and recovered as in Example 1.

(b) Part (a) was repeated except that 3.2 grams of emulsified 35% hydrogen peroxide aqueous emulsion in hexane (about a 2:1 peroxide to halogen mole ratio) was added to the reaction media concurrently with the addition of $Br_2$.

(c) Part (a) was repeated except that 3.2 grams of the emulsified hydrogen peroxide were added to the reaction mixture after the reddish brown $Br_2$ color in the reaction mixture had faded to a light tan color. After the peroxide addition, the reaction was continued for an additional 50 minutes prior to neutralization.

NMR analysis of these brominated polymers showed results as indicated in Table 2.

TABLE 2

REGENERATIVE BROMINATION (VAZO INITIATION)

| $H_2O_2$ Addition Sequence | BrPMS Mole % | BR Utilization (BrPMS) | PMS Conversion | $Br_2$PMS Mole % |
|---|---|---|---|---|
| (a) Control No $H_2O_2$ | 0.77 | 36.3% | 22.7% | 0 |
| (b) Add $H_2O_2$ together w/$Br_2$ | 0.94 | 44.3 | 27.2% | 0 |
| (c) Add $H_2O_2$ after $Br_2$ color faded | 1.37 | 64.6% | 40.0% | 0.01 |

Bromine Charge: 3 wt % or 2.12 mole % based on polymer.

The data in Table 2 indicate that when $H_2O_2$ was added into the cement simultaneously with $Br_2$, the reddish color of $Br_2$ stayed significantly longer than the control and the bromine utilization was only about 20% higher than the control. It suggests that the VAZO radicals can react/interfere with $H_2O_2$ and a significant amount of the $H_2O_2$ might have been destroyed by VAZO radicals before it could react with HBr and regenerate the Br.

However, when $H_2O_2$ was added after most of the $Br_2$ was consumed (based on cement color), the BrPMS on polymer and the bromine utilization were increased by about 80% from the control run under similar conditions. It is most likely that, after the initial $Br_2$ charge was consumed, the VAZO radical concentration was reduced (according to the half-life of VAZO at 50° C.) and the HBr concentration in cement was the highest so that the fast reaction between $H_2O_2$ and HBr became predominant.

The data show that the Regenerative Bromination process can be used in processes by including the addition of $H_2O_2$ between two reactors. In such a scenario, a reduced $Br_2$ charge can be added and consumed in the first reactor and then the $H_2O_2$ can be added between the first and second reactors (into a high shear in-line mixer) to convert all HBr back to $Br_2$ before it reaches the second reactor. Assuming proper temperature in the second bromination reactor, most of the regenerated $Br_2$ would be consumed and thus significantly less caustic is needed to neutralize the residual $Br_2$ and/or HBr in the second reactor.

What is claimed is:

1. A process for halogenating a copolymer of a $C_4$ to $C_7$ isomonoloolefin and a para-alkylstyrene comprising contacting said copolymer under free radical halogenation conditions with a halogenating agent and hydrogen peroxide, and recovering the halogenated copolymer containing at least about 0.05 mole % of haloalkyl groups.

2. The process of claim 1 wherein said halogenating agent is elemental bromine.

3. The process of claim 1 wherein the molar ratio of hydrogen peroxide to halogenating agent is in the range of from about 0.1 to about 3.

4. The process of claim 3 wherein said molar ratio is at least about 1.

5. The process of claim 1 wherein a solution of said copolymer in organic solvent is contacted with liquid bromine and wherein said free radical halogenation conditions comprise exposure to light.

6. The process of claim 1 wherein a solution of said copolymer in organic solvent is contacted with liquid bromine and wherein said free radical conditions comprise contact of the copolymer with an organic free-radical initiator.

7. The process of claim 6 wherein said free radical initiator is a bis-azo compound selected from the group consisting of azobisisobutyronitrile, azobis (2-methyl butyro) nitrile, 2,2'-azobis(2,4,4 trimethyl pentane nitrile) and azobis (2,4 dimethyl valero) nitrile.

8. The process of claim 1 wherein said copolymer contains at least about 80 wt % of isobutylene and from about 0.5 up to about 20 wt % of para-methylstyrene.

9. The process of claim 1 wherein said halogenated copolymer contains from about 0.1 to 10 mole % of haloalkyl groups.

10. A process for halogenating a copolymer of a $C_4$ to $C_7$ isomonoolefin and a para-alkyl styrene comprising:

a) contacting said copolymer with a halogenating agent and an organic free radical initiator under free radical halogenation conditions to form a reaction product mixture containing a partially halogenated copolymer and in-situ generated hydrogen halide;

b) contacting said reaction product mixture from step (a) with an oxidizing agent capable of converting said hydrogen halide to free halogen; and c) continuing said halogenation until a halogenated copolymer containing at least about 0.05 mole % of haloalkyl groups is obtained.

11. The process of claim 10 wherein said halogenating agent is elemental bromine and wherein said hydrogen halide is HBr.

12. The process of claim 10 wherein said oxidizing agent is hydrogen peroxide.

13. The process of claim 10 wherein the reaction product mixture from step (a) is contacted with said oxidizing agent in step (b) after at least about 50 wt % of said halogenating agent is consumed in step (a).

14. The process of claim 10 wherein the molar ratio of said oxidizing agent to said halogenating agent is in the range of from about 0.1 to about 3.

15. The process of claim 14 wherein said molar ratio is at least about 1.

16. The process of claim 10 wherein said free radical initiator is a bis-azo compound selected from the group consisting of azobisisobutyronitrile, azobis (2-methyl butyro) nitrile 2,2'-azobis(2,4,4 trimethyl pentane nitrile), and azobis (2,4 dimethyl valero) nitrile.

17. The process of claim 10 wherein said halogenated copolymer contains from about 0.1 to 10 mole % of haloalkyl groups.

18. A multi stage process for brominating a copolymer of a $C_4$ to $C_7$ isomonoloefin and a para-alkylstyrene comprising:

a) forming a solution of said copolymer in organic solvent in a first reactor zone;

b) contacting said solution with elemental bromine and an organic free radical initiator under free radical bromination conditions to form a reaction product mixture comprising a partially brominated copolymer and an in-situ generated hydrogen bromide;

c) transferring said reaction product mixture to a second reactor zone and contacting said mixture with an oxidizing agent capable of converting said hydrogen bromide to free bromine; and d) continuing said bromination in said second reactor zone until a brominated copolymer containing at least about 0.05 mole % of bromoalkyl groups is obtained.

19. The process of claim 18 wherein said free radical initiator is a bis-azo compound selected from the group consisting of azobisisobutyronitrile, azobis (2-methyl butyro) nitrile, 2,2'-azobis(trimethyl pentane nitrile), and azobis (2,4 dimethyl valero) nitrile.

20. The process of claim 18 wherein said copolymer from step (d) contains at least about 10.0 mole % of bromoalkyl groups.

21. The process of claim 18 wherein said copolymer contains from about 0.1 to 1.0 mole % of bromomethyl groups.

22. The process of claim 18 wherein at least about 50 wt % of said bromine is consumed in step (b).

23. The process of claim 18 wherein contact of said mixture from step (b) and said oxidizing agent occurs in a mixing zone positioned between said first and second reactor zones.

24. The process of claim 18 wherein said oxidizing agent is hydrogen peroxide.

25. The process of claim 18 wherein the molar ratio of said oxidizing agent to said halogenating agent is in the range of from about 0.1 to about 3.

26. The process of claim 1 wherein said oxidizing agent is in the form of an emulsion.

27. The process of claim 18 wherein said copolymer contains at least about 80 wt % of isobutylene and from about 0.5 up to about 20 wt % of para-methylstyrene.

* * * * *